(12) United States Patent
Harding et al.

(10) Patent No.: US 10,657,603 B1
(45) Date of Patent: May 19, 2020

(54) INTELLIGENT ROUTING CONTROL

(71) Applicant: Progressive Casualty Insurance Company, Mayfield Village, OH (US)

(72) Inventors: Jarrod D. Harding, Mayfield Village, OH (US); Rick A. Bliss, Mayfield Village, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

(21) Appl. No.: 16/374,480

(22) Filed: Apr. 3, 2019

(51) Int. Cl.
| | | |
|---|---|---|
| *G06N 99/00* | (2019.01) | |
| *G06Q 40/08* | (2012.01) | |
| *G06F 16/11* | (2019.01) | |
| *G06N 20/00* | (2019.01) | |
| *G06F 7/14* | (2006.01) | |
| *G06F 16/93* | (2019.01) | |

(52) U.S. Cl.
CPC ............ *G06Q 40/08* (2013.01); *G06F 7/14* (2013.01); *G06F 16/116* (2019.01); *G06F 16/93* (2019.01); *G06N 20/00* (2019.01)

(58) Field of Classification Search
CPC ....... G06Q 40/08; G06F 16/93; G06F 16/116; G06F 7/14
See application file for complete search history.

(56) References Cited

U.S. PATENT DOCUMENTS

| | | | | |
|---|---|---|---|---|
| 8,532,374 B2* | 9/2013 | Chen | .................. | H04N 1/40062 382/164 |
| 9,015,301 B2* | 4/2015 | Redlich | .................. | G06Q 10/10 709/223 |
| 10,204,143 B1* | 2/2019 | Dub | ....................... | G06F 16/285 |
| 10,332,008 B2* | 6/2019 | Burger | .................... | G06N 5/022 |
| 2003/0200234 A1* | 10/2003 | Koppich | ................. | G06F 16/93 |

(Continued)

FOREIGN PATENT DOCUMENTS

WO    WO-2018006004 A1 *  1/2018  ........... G06K 9/6282

OTHER PUBLICATIONS

Vaghela et al., "Boost a Weak Learner into a Strong Learner Using Ensemble System Approach," Dept. of Computer Engineering and Dept. of IT, CIT, Changa, Gujarat, India (Year: 2009).*

*Primary Examiner* — Alexander G Kalinowski
*Assistant Examiner* — William B. Bunker
(74) *Attorney, Agent, or Firm* — Benesch, Friedlander, Coplan & Aronoff LLP

(57) ABSTRACT

A system and method classify insurance documents. The system and method receive a request to access documents from an assessment queue stored in a memory of a device where each of the documents contain insurance data and have an associated destination and associated metadata. The system and method convert the set of documents encoded in a first file format to a second file format to remove the metadata. The system and method partition each document of the set of documents into separate stand-alone documents and converts each of the partitioned documents into separate recognition vectors. The system and method classifies the partitioned documents through an additive learning algorithm in which routing data is embedded in second metadata and merge the classified partitioned documents. The merged documents are routed to a remote destination independent of the originally intended destination and the associated metadata.

30 Claims, 7 Drawing Sheets

(56) References Cited

U.S. PATENT DOCUMENTS

| | | | |
|---|---|---|---|
| 2005/0141028 A1* | 6/2005 | Koppich | G06F 16/93 |
| | | | 358/1.15 |
| 2007/0208719 A1* | 9/2007 | Tran | G06F 16/951 |
| 2008/0005139 A1* | 1/2008 | Hysom | G06F 16/16 |
| 2008/0071575 A1* | 3/2008 | Climax | G06Q 50/22 |
| | | | 705/2 |
| 2008/0168135 A1* | 7/2008 | Redlich | G06Q 10/10 |
| | | | 709/204 |
| 2009/0116746 A1* | 5/2009 | Neogi | G06K 9/00442 |
| | | | 382/190 |
| 2014/0172753 A1* | 6/2014 | Nowozin | G06N 20/00 |
| | | | 706/12 |
| 2014/0229407 A1* | 8/2014 | White | G06Q 10/10 |
| | | | 706/12 |
| 2014/0279741 A1* | 9/2014 | Sow | G06N 20/00 |
| | | | 706/12 |
| 2016/0055413 A1* | 2/2016 | Popov | G06K 9/00469 |
| | | | 706/55 |
| 2017/0026543 A1* | 1/2017 | Tahiliani | G06Q 10/00 |
| 2017/0346828 A1* | 11/2017 | Lorensson | G06F 17/211 |
| 2018/0060302 A1* | 3/2018 | Liang | G06F 17/277 |
| 2018/0067957 A1* | 3/2018 | Paterson | G06F 16/93 |
| 2018/0143975 A1* | 5/2018 | Casal | G06F 17/2785 |
| 2018/0217991 A1* | 8/2018 | Dato | G06F 16/90335 |
| 2018/0300315 A1* | 10/2018 | Leal | G06F 16/355 |
| 2018/0365593 A1* | 12/2018 | Galitsky | G06F 21/606 |
| 2019/0266573 A1* | 8/2019 | Radhakrishnan | G06N 20/00 |

* cited by examiner

INTELLIGENT ROUTING CONTROL

BACKGROUND OF THE DISCLOSURE

1. Technical Field

This disclosure relates to automated agents, and specifically to automated agents that execute document classifications and determine document distributions at the page level.

2. Related Art

The conversion and distribution of physical documents is challenging. Documents come in many forms and contain diverse content. The documents include proof of prior insurance, insurance cancellation documents, credit authorization forms, discount forms, uninsured motorist forms, insurance application packets, etc., and any combination of information. The endless sizes, page orientations, layouts, and formats make it nearly impossible to process and translate documents into standardized forms. Many systems cannot make logical deductions, make logical inferences, or detect incomplete information. The systems do not learn from experiences or analyze contexts.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

DETAILED DESCRIPTION

A processing system and method (referred to as a processing agent) translate and expedite content delivery of physical and virtual documents. The processing agent's end-to-end learning system discovers contexts and uses contextual knowledge to efficiently route documents to destinations. A detection system accurately detects anomalies, and in some applications, protects backend systems from unsolicited messages asynchronously transmitted to many recipients. An automated job separation system parses documents by breaking documents into pages so that only desired pages are routed to apt destinations. The job separation system enables multiple documents to be processed simultaneously without job separation sheets.

Some processing agents include export application programming interfaces (APIs) that transmit documents in any desired format to a folder, an address, or a destination. Some systems transmit commands that enable scripts. Scripts may request information from remote sources, generate and transmit forms to users, notify users of outcomes, and issue audible or visual alerts to sources or users that signal an error, missing information, or represent a warning. Some document processing agents execute data compressions that reduce memory and bandwidth use. The document processing agents execute classifications across multiple nodes allowing the processing agents to distribute classification and distribution jobs across local and/or remote computing resources.

Figure 1:
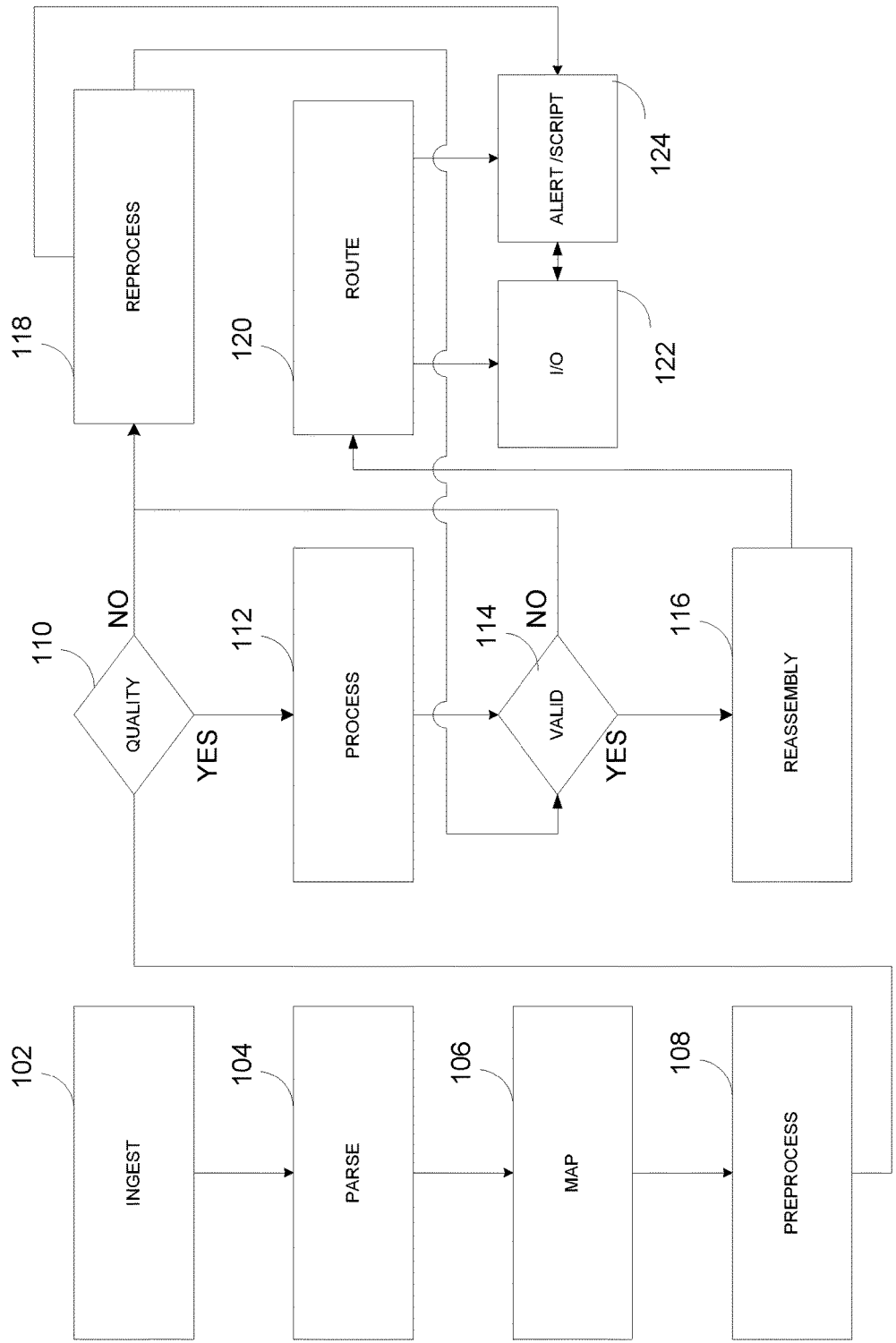
FIG. 1 is a process flow of a processing agent.
Figure 2:
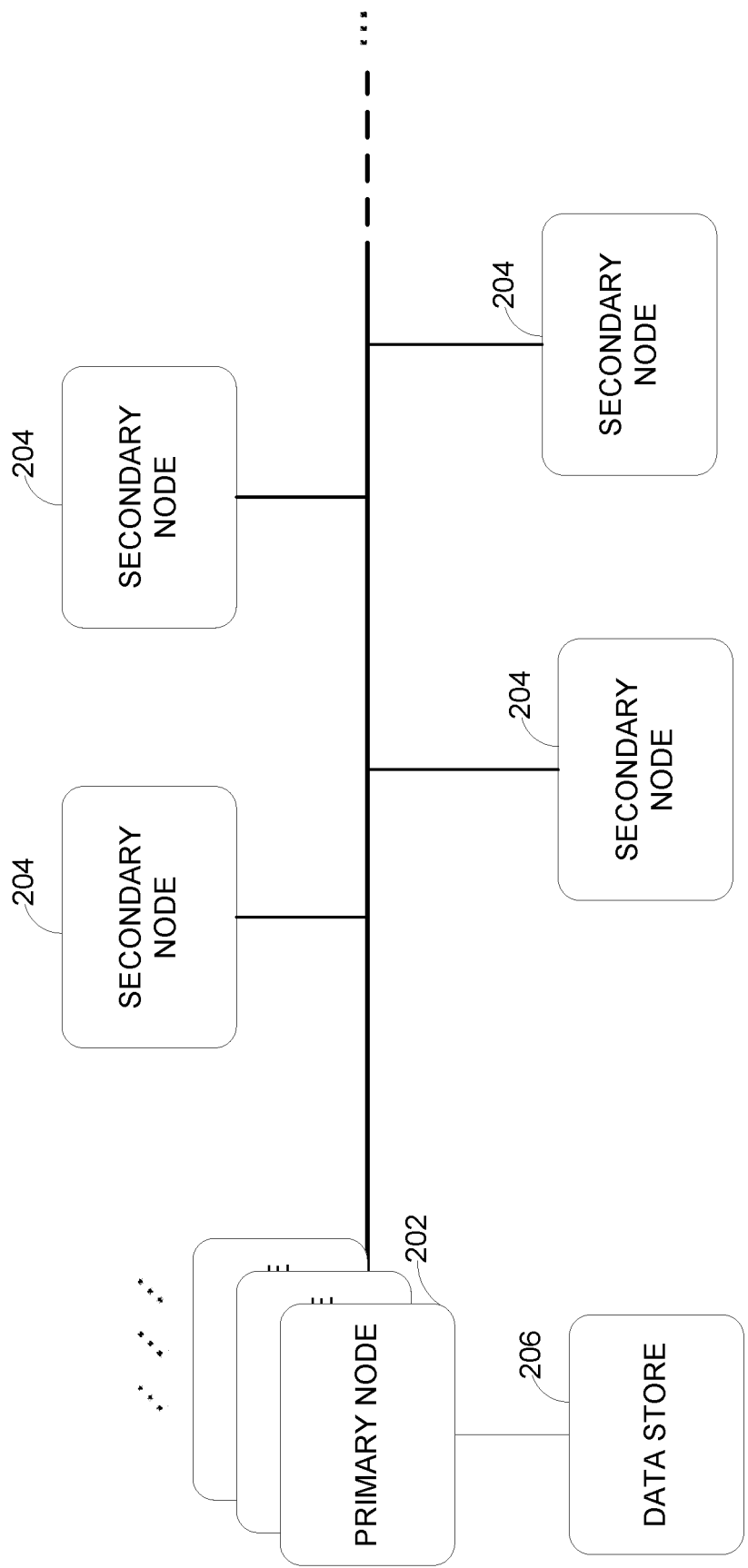
FIG. 2 is block diagram of a processing agent.

FIG. 1 is a block diagram of a document processing agent that provides document conversions and routing through primary nodes 202 and secondary nodes 204 shown in FIG. 2. The primary nodes 202 pre-process, parse, track, and reassemble select pages of the documents received and stored in an assessment queue that ingests input 102. The secondary nodes 204 detect and classify content, validate content, and generate and embed routing data into individual pages or metadata that is processed to route the content to correct destinations over the most efficient transmission route available to the processing agent. Routing occurs at the page level independent of the original intended destination of the document. The independent routing occurs through machine learning without relying strictly on deterministic rules. The primary and secondary nodes 202 and 204 are clients, servers, or peers to other primary 202 and secondary nodes 204 and utilize a separate processor or graphical processor unit that communicate through a communication system such as a bus. The secondary nodes 204 operate asynchronously and independently of each other and the primary nodes 202 and process documents or portions of them simultaneously in parallel (i.e., the processing of input in tandem at the same time). Each secondary node 204 is analogous to a separate processor with access to local memory that detects, classifies, and validates content and generates routing data mapped or directly inserted into metadata and/or the individual pages through a parallel architecture.

In FIG. 1, an assessment queue receives and stores one or more documents from a local or remote source such as a memory or a device (represented as ingest 102). The assessment queue is a multi-element data structure that adheres to a first-in-first-out (FIFO) processing sequence. In alternate processing agents, document removal from the assessment queue is based on factors other than the order of insertion; for example, when a priority value is assigned to one or more documents, the priority value may change the output sequence of the assessment queue. In yet another alternate system, a dequeue is used in which documents are added or removed from either an insertion input/output (I/O) port or a removal I/O port of the dequeue. That is, the dequeue can operate in a last-in-first-out (LIFO) sequence, a FIFO sequence, or a combination of LIFO and FIFO sequences during a conversion and/or routing session. A session refers to a series of requests and responses to complete the task or a set of tasks such as the processing, reassembly, and/or routing of pages or documents between clients and servers. A client is a device that accesses resources from another device via a network connection and a server is the device that responds to the client and controls access to the network and the server's resources.

In FIG. 1, one or more primary nodes 202 process the documents stored in the assessment queue. The primary nodes 202 filter the documents to detect content resolution and page orientation. A parser 104 converts the documents from one file format to another file format. The conversion removes the original metadata appended to the documents. The conversion also rips or extracts pages from documents rendering smaller documents or files, with each of ripped page representing no more than the size of a physical page. A physical page is one side of a single sheet of paper. It maybe in standard sizes that are frequently referenced as letter size, legal size, executive size, A4 size, A5 size, A6 size, B5 size, B6 size, postscript size, or an envelope size. In some applications, the total number of pages in a document determines the minimum number of documents or files rendered by the parser 104. Pages are ripped at an identifying page, section delimiters, headers, page breaks, section breaks, identifiers, etc.

To ensure ripped pages are distributed across computing resources, the primary node 202 distributes the computational and storage workload across the secondary nodes 204 at 106 and tracks page distribution in a data store 206. Distribution optimizes resource use, maximizes throughput, minimizes response times, and avoids overload conditions at the secondary nodes 204. In some document processing agents, multiple primary nodes 202 distribute the ripped pages, which increases the reliability of the processing agent through redundancy. To improve character recognition, each secondary node 204 sharpens text, straightens images (e.g., deskew), applies one or more descreen filters that remove artifacts, and/or removes the backgrounds. These processes improve textual and character matching at 108.

The secondary nodes 204 analyze text and characters by analyzing optical contrasts (e.g., a detection of dark and light). Once detected, the secondary nodes 204 execute a pattern matching with a stored set of shapes and characters to translate the analyzed elements into an ASCII character set. Each data element of the character set includes a confidence score that represents a probability that the results returned match the content contained in the document. Because different typefaces and text treatments, such as bold and italic formats, for example, can significantly affect the way text and characters are detected, some processing agents execute sophisticated pattern-matching to learn new characters, typefaces, and adapt to different character sizes. Alternate systems achieve high accuracy by executing intelligent word recognition; and other alternates limit input to predefined text and character formats. In FIG. 1, when a confidence score is below a predetermined threshold, the secondary node 204 sets a flag, which terminates the recognition and causes the primary node 202 or secondary node 204 to transmit the subject page(s) to a remote or manual recognition at 110 and 118 or execute a recursive analysis of the processing described above (e.g., "n" number of repetitions of the classification analysis described). The flag is a marker of some type used by the primary node 202 to indicate the existence or status of a particular classification condition.

In FIG. 1, an encoding function converts the recognized text and characters into a recognition vector. The scalar variable of the vector may be assigned by a scalar function and adjusted by a weighting function that gives some words and phrases and characters of the document more "weight" or influence than other words and phrases. Weights may be assigned based on word and phrase counts in a page, their presence in an active grammar, or based on their association with pre-identified document types. An active grammar is a file that contains a list of words and phrases recognized by the machine learning algorithm.

In FIG. 1, the machine learning algorithm designates pages into classes or categories of documents through rules or decision trees that process the recognition vector at the secondary nodes 204 at 112. The decision trees process the recognition vector based on features that either classify the pages or predict the document types that the recognition vector belongs to. A document type refers to characteristics or identifiers that represent the characteristics that may be embedded in metadata or the document itself that identifies or defines the document. It may include elements and attributes. For example, an insurance quote, an insurance application, and an insurance claim are different insurance document types.

In FIG. 1, each branch in the decision tree divides data elements into several groups. Each leaf node is allocated with a single label, such as a class or a predicted value. The data is allocated to the appropriate leaf node, and the prediction is the label of that leaf node. To avoid overfitting, multiple decision trees are added together. For instance, when an exemplary document processing agent attempts to identify an insurance claim, the predicted identity at any point is the sum of the predictions of the individual decision trees trained on claim data.

Before use, each decision tree is trained iteratively one decision tree at a time. For example, when a decision tree attempts to identify an insurance claim page, the system first trains a decision tree on words and phrases that are unique to insurance claims. The decision tree is trained to minimize a loss function—such as a mean squared error (when mean is used) or mean absolute error (when median is used), for example,—by recursively splitting the training data in a way that maximizes a recognition of insurance claim criterion until a limit is met. The criterion is chosen so that the loss function is minimized by each split. In some alternate machine learning algorithms, the process is based on an extreme gradient boost.

A second decision tree is then trained to minimize the loss function of the first decision tree when its outputs are added to the first decision tree. This is achieved by recursively splitting the training data according to a second criterion. The criterion may be calculated based on gradient statistics. A third decision tree is then sequentially trained to minimize the loss function of the second decision tree when its outputs are added to the first and the second decision trees. This is achieved by recursively splitting the training data according to a third criterion. Thereafter, "n" number of subsequent trees are sequentially generated and added to the algorithm such that each subsequent tree aims to reduce the errors rendered by the previous tree. Each tree learns from its immediate predecessors and updates the learning algorithm's residual errors. Hence, the tree that grows next in the sequence will learn from an updated version of the residuals and in effect render a stronger learned model by effectively combining the predictive power of all of the prior decision trees.

The time needed to train a tree-based algorithm is proportional to the number of splits that are evaluated. Since small changes in the split may not significantly affect performance, some methods group features into bins and split the bins instead of the features based on gradient statistics. This evolutionary process is like subsampling the number of splits that the prediction or classification algorithm evaluates. Since the features can be binned before building each tree, the evolutionary process speeds up training and reduces computational complexity.

When the characteristics of the recognized vector is classified by the machine learning algorithm at 112 and optional deterministic rules that execute comparisons between recognized and predetermined words and/or phrases, the document type classification is generated and embedded or mapped into the page and/or metadata thereafter associated with the page. Some processing agents then validate the classifications at the primary or secondary node 202 or 204 at the page level at 114. For example, if a page is designated a proof of insurance document, a primary or secondary node 202 or 204 may execute a comparison against valid insurance policy content, valid insurance policy numbers, valid insurance policy formats, valid insurance policy digital signatures (e.g., a comparison to known patterns), or other criteria. If unconfirmed, the pages are routed to a reprocessing 118 which may occur via remote or manual recognition at 118 or via a recursive analysis of the processing described above (e.g., "n" number of repetitions of the classification analysis described). If confirmed, the primary node 202 assembles new documents from the classified pages.

Assembly occurs through merger rules and sub-rules at 116. The sub-rules allow users or devices to issue commands that merge pages through two or more criteria. For example, an exemplary merger rule may merge pages based on a single criterion. A rule may cause the primary node 202 to merge pages that share a common classification. However, when one or more rules and one or more sub-rules are executed with a Boolean operator (e.g., AND, OR, NOT, etc.) or function a more advanced merging occurs. For example, a rule and sub-rule combination may cause a primary node 202 to combine pages that originate from an originating document (e.g., an unparsed document) or source and share a common classification with a dynamically generated or originally received cover sheet. The cover sheet page may serve as a source identifier. It is the page level classifications rather than an originating document designation and merger strategies that determine which pages are routed to separate and unique destinations and where the pages are routed. In some instances, pages are routed to multiple destinations automatically (without user directions) simplifying a user's online experience and reducing the bandwidth required to support multiple request/response exchanges.

In FIG. 1, merger strategies may be stored in individual profiles in memory. The profiles allow users to customize merger strategies that may be based on any property or metadata associated with the classified pages, identified document types, and/or originating document and/or any other criteria or criterion. The profiles may determine how page merges occur (e.g., what criteria determines page selection), where the merges occur (e.g., at the primary or secondary nodes 202 and 204), the computer file formats they occur in (e.g., what format is used, a portable document format, a WORD format, an image format, etc.), when they occur (e.g., timing), how the merged pages are compressed, and/or how the merged pages are distributed (e.g., the medium, email, file transfers, etc.).

With the processed documents assembled from the page level independent of the composite or arrangement of the original document, the processing agents route the newly assembled document at 120 to one or more destinations or trigger an alert or enable script at 122 and 124. The trigger may occur in response to the classification. In FIG. 1 the metadata generated by machine learning algorithm determines where the processed document is routed and whether it triggers a script or initiates an alert. A script or an alert may be triggered when the document is missing information or when it is filled out incorrectly. As a result, a script may generate a new form, provide additional instructions, transmit a message directly to a user or device (e.g., via an email or via the transmission of a Uniform Resource Locator or URL) that are automatically transmitted to the user or device in response to the automated routing or manual or remote review. A script is a computer program consisting of a set of instructions executed by an application or a utility program.

Figure 3:
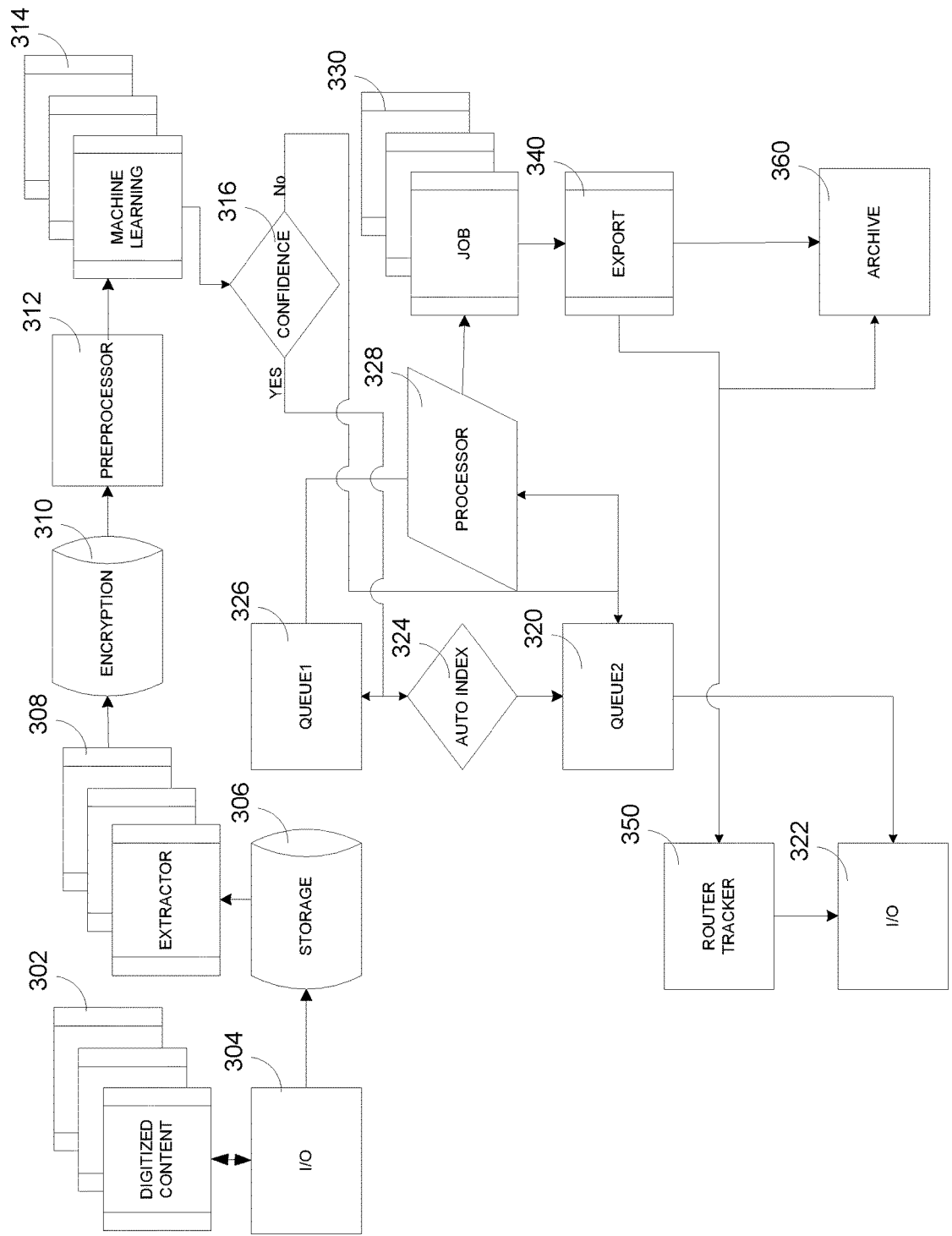
FIG. 3 is a process flow of a second processing agent.

FIG. 3 illustrates a second processing agent in which the digitized content 302 is received and ingested in the assessment queue in memory 306 through an I/O request from a remote and/or local source and/or device. I/O requests are commands, such as read and write commands, used to transfer data among various components or portions of components of the processing agents. An API 304 interfaces the digitized content between the processing agent platform and the remote and/or local sources and/or devices.

In FIG. 3 one or more primary nodes 202 process the digitized content stored in the assessment queue. The primary nodes 202 filter the content to detect image resolution and page orientation. An extractor 308 removes metadata originally appended or embedded to or within the digitized content. The removal may occur via many processes, including a conversion of the digitized content from one computer file format to another computer file format, or converts it to the same computer file format. The conversion removes metadata originally appended, embedded to, or mapped to the digitized content. The extractor 308 also extracts pages or divides/partitions the content from the digitized content file rendering smaller documents or files, with each page representing no more than a single digital page of the digitized content. A digital page is a fixed block of memory, consisting of a plurality of bytes, programmed to be read from memory. It is analogous to one side of a single sheet of physical paper or a portion of a Web page that can be seen on a standard computer display. In some applications, the total number of extracted pages from the digitized content or a predetermined length or file size determines the minimum number of documents or files rendered by the extractor 308. Pages are extracted at visible or hidden identifiers, section delimiters, headers, page breaks, section breaks, etc.

A computationally secure encryption process secures the extracted pages in a database at 310. The encryption uses cryptosystems that are computationally infeasibly to break. An algorithm is computationally secure (sometimes called strong) if it cannot be broken with available resources, either current or in the future. A self-enforcing hybrid cryptosystem that uses controlled session keys and user-controlled key policies and/or a volume encryption is an exemplary encryption process used in some processing agents.

To ensure extracted pages are distributed across computing resources, the primary node 202 distributes the computational and storage workload across the secondary nodes 204 at 312 and tracks page distribution in the data store 206. In some processing agents, multiple primary nodes 202 distribute the ripped pages. Each secondary node 204 sharpens text, straightens images, applies one or more descreen filters that remove artifacts, and/or removes the backgrounds that improve textual and character matching contrast at 312.

The secondary nodes 204 analyze text and characters through an optical recognition. Once detected, the secondary nodes 204 execute a pattern matching with a stored set of shapes and characters to the translate the analyzed elements into an ASCII character set. Each data element of the character set includes a confidence score that represents a probability that the results returned matches the content contained in the document. Alternate systems achieve high accuracy by executing intelligent word recognition. In FIG. 3, when a confidence score is below a predetermined threshold, the secondary node 204 terminates the recognition and causes the primary node 202 or secondary node 204 to transmit the subject page(s) to a remote or manual recognition or a recursive analysis of the processing described above (e.g., "n" number of repetitions of the classification analysis described).

In FIG. 3, an encoding function converts the recognized text and characters into a recognition vector at 312. The scalar variable of the vector is assigned by a scalar function and adjusted by a weighting function. Weights are assigned based on word and phrase counts on a page, their presence in an active grammar, or based on their association with pre-identified document types.

In FIG. 3, one or more machine learning algorithms classifies pages into categories of documents through rules, decision trees, and/or other models that process the recognition vector at the secondary nodes 204. The machine learning algorithms process the recognition vector based on features to either classify the pages or predict or classify the extracted pages into the document type or types the recognition vector belong to. A document type refers to characteristics or identifiers that represent the characteristics that are embedded in metadata or a document that identifies or defines the documents.

In FIG. 3, one or more machine learning algorithms may be derived from an initial model that is designed to predict a page and/or document classification. The model $M_0$ is associated with a residual that may be represented as $b-M_0$. A second model $M_1$ is generated to fit or minimize the residuals of the prior module $M_0$. The first and the second models are combined $M_0+M_1$ rendering a boosted version of the initial model $M_0$ and result in a lower mean squared error than the initial model $M_0$. The equation may be expressed as: $M_1(x)<M_0(x)+M_1(x)$. A third model $M_2$ may then be created that models the second networks residuals to improve the performance of the second model. This is repeated sequentially for "n" iterations until the residuals are minimized to a desired prediction level or mean squared error. A generalized expression of the mean squared error maybe expressed as: $M_n(x)<M_{n-1}(x)+M_n(x)$. As such the additive learning algorithms, which may be encompassed in decision tress, neural networks, etc. do not disturb the functions expressed in the previous models. Instead, summation of models imparts additional predications that reduce errors.

When the characteristics of the recognized vector are classified by the machine learning algorithm at 112 or deterministic rules that match recognized words and phrases to predetermined words and phrases and/or contexts that uniquely identify document types, the document type classification is embedded into or mapped to the classified page or associated to it through metadata. Some processing agents then validate the classifications at the primary or secondary node 202 or 204 at the page level. Each validation includes a confidence score that represents a probability that the classification matches the predicted document type. For example, if a page is classified as a proof of insurance document, a primary or secondary node 202 or 204 may execute a comparison against pre-validated insurance policy content, valid insurance policy numbers, validated insurance policy formats, validated digital signatures (e.g., a comparison to known patterns), or other criteria via a field search. If unconfirmed, the pages are routed to a reassessment queue 320 that holds the pages until they are reprocessed by the processes described herein or held until an I/O request is received at API 322. A request may initiate a different recognition process or a manual process. If or when confirmed, the classified pages are automatically indexed at 324 and staged in the reassembly queue 326 to be used to generate new documents. In FIG. 3, the reassessment queue 320 and/or the reassembly queue 326 operate as a dequeue in some systems and/or adhere to a LIFO, FIFO sequence, or follow a combination of LIFO and FIFO processes in other systems. The API 320 interfaces the processing agent platform to remote and/or local sources and/or devices.

Document assembly occurs through merger rules and sub-rules through processor 326. One or more sub-rules allow users or devices to issue commands that merge pages through different and multiple criteria. For example, an exemplary merger rule may merge pages based on a single criterion. A rule may cause the primary node 202 to merge pages that share a common classification. However, when multiple rules and one or more sub-rules are executed with a Boolean operator a more advanced merging occurs. For example, a rule and sub-rule combination may cause a primary node 202 to combine pages that originate from a common or an originating document (e.g., an unparsed document) or source and share a common classification with a dynamically generated or originally received cover sheet. The cover sheet may be a source identifier.

In FIG. 3, merger strategies may be stored in individual profiles in memory. The profiles allow users to customize merger strategies that may be based on any property or metadata associated with the classified pages, identified document types, and/or originating document and/or another criteria or criterion. The profiles may determine when merging occur, where they occur, how they occur, the computer file formats they occur in, and how the merged pages are compressed and/or how the merged pages are distributed (e.g., the medium). The compression reduces the memory and bandwidth consumed in storing and transmitting documents. Here, instead of routing entire documents to destinations, processing agents independently and automatically partition the document or digitized content, and route only the select classified pages (e.g. to one or multiple destinations) based on the machine learning page level classifications. In instances where page level classifications have conflicting routing destinations, the export API 340 routes the select classified pages to the highest ranked destinations. This is analogous to a class vote.

With the processed documents assembled at the page level independent of the original document, the merged documents are assigned to a job index 330. The job index improves the page retrieval operation by maintaining a data structure that can locate every classified page without executing a page search. The job index 330 provides a basis for both rapid random lookups and efficient access to classified pages and their metadata. The assembled pages are then routed by an export API 340 that transmits the documents to a destination based on the classifications. Routing information is retained in a log file as a log entry. A log entry is a set of data entries read from and written to by the router tracker 350 that identify the routing information. In FIG. 3 the metadata generated by machine learning algorithm determines where the processed document is going and whether to trigger a script or initiate an alert. A script or alert may occur when a merged document is missing information or was filled out incorrectly. As a result, the script may generate a new document or form, provide additional instructions to respond to the alert, or transmit a message directly to a user. The message maybe delivered through email or a uniform resource locator.

Figure 4:
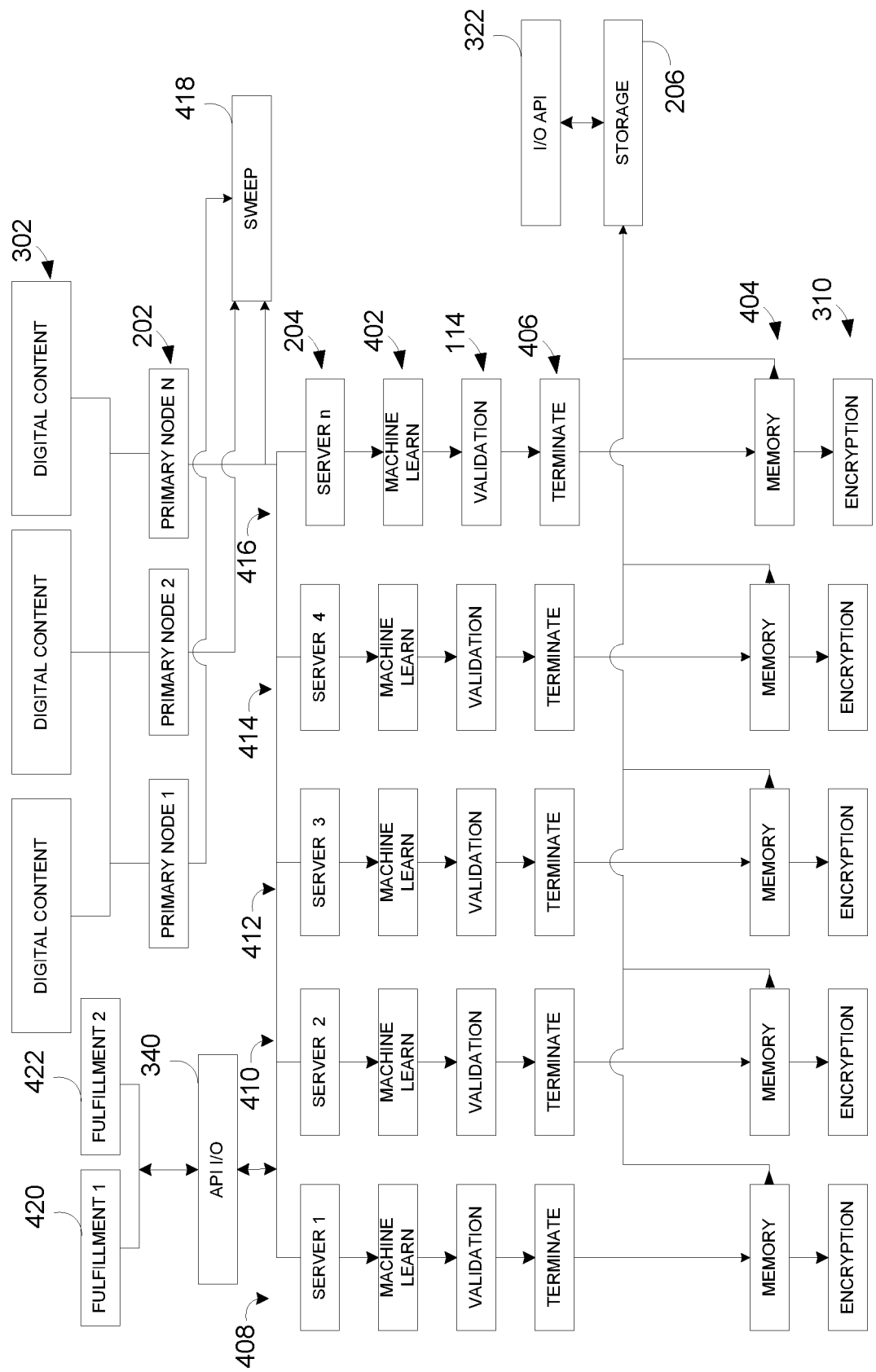
FIG. 4 is a block diagram of a processing agent integrated within an enterprise.

FIG. 4 is an alternate block diagram that integrates a processing agent into an enterprise system. In FIG. 4 digitized content 302 is received and ingested in the assessment queue in memory through an I/O request from a remote and/or local source and/or device. An integrated API within the primary nodes 202 interfaces the digitized content between the processing agent platform and the remote and/or local sources and/or devices.

In FIG. 4 a plurality of primary nodes 202 process the digitized content stored in the assessment queue. The primary nodes 202 filter the content to detect image resolution and page orientation. It converts the content from one file format to another or same format, which removes metadata originally appended, mapped, or embedded to or within the digitized content. The primary nodes 202 also extract pages or divides the content from the digitized content queue rendering smaller documents or files, with each page representing no more than a single digital page of the digitized content. In some applications, the total number of extracted pages from the digitized content or a predetermined length or file size determines the minimum number of documents or files rendered by the primary node 202. Pages are extracted at visible or hidden identifiers, section delimiters, headers, page breaks, section breaks, etc.

To ensure extracted pages are distributed across computing resources, the primary nodes 202 distributes the computational and storage workload across the secondary nodes 204 (shown as servers 1 to N) and track page distribution in the data store 206. Each secondary node 204 sharpens text, straightens images, applies one or more descreen filters that remove artifacts, and/or removes the backgrounds that improve textual and character matching contrast at 312.

The secondary nodes 204 analyze text and characters through a character recognition. Once detected, the secondary nodes 204 execute a pattern matching with a stored set of shapes and characters to the translate the analyzed elements into an ASCII character set. Each data element of the character set includes a confidence score that represents a probability that the results returned matches the content contained in the document. Alternate systems achieve high accuracy by executing intelligent word recognition. In FIG. 4, when a confidence score is below a predetermined threshold, the secondary node 204 terminates the recognition and causes one of the primary nodes 202 or secondary nodes 204 to transmit the subject page(s) to a remote or manual recognition or initiates a recursive analysis of the processing described above (e.g., "n" number of repetitions of the classification analysis described).

In FIG. 4, an encoding function executed on the secondary nodes 204 converts the recognized text and characters into a recognition vector. The scalar variables of the vector are assigned by a scalar function and adjusted by a weighting function. Weights are assigned based on word and phrase counts on a page, their presence in an active grammar, or based on their association with pre-identified document types.

In FIG. 4, one or more machine learning algorithms 602 classify pages into categories of documents through rules, decision trees, and/or other models that process the recognition vector at the secondary nodes 204. The machine learning algorithms described herein process the recognition vector based on features to either classify the pages or predict extracted pages into the document type or types the recognition vector belong to.

When the characteristics of the recognized vector is classified by the machine learning algorithms 402 or deterministic rules that match recognized words and phrases to predetermined words and phrases or contexts that uniquely identify document types, the document type classification is embedded into the classified page or associated to it through metadata encrypted in memory 310 and 404. Some processing agents then validate the classifications at the primary or secondary nodes 202 at the page level. Each validation includes a confidence score that represents a probability that the classification matches the predicted document type. If unconfirmed, the pages are routed to a reassessment queue (not shown) that holds the pages until they are reprocessed by the processes described herein or held until an I/O request is received at the primary nodes 202. A request may initiate a different automated recognition process or a manual recognition process. If or when confirmed, the classified pages are automatically indexed at the secondary nodes and staged in a reassembly queue to be processed into new documents. In FIG. 4, the reassembly queue is integrated within the primary nodes 202.

In FIG. 4, a control engine within the primary nodes 202 enforces a time-out function for each page spread across the secondary nodes. If a classification or prediction process exceeds a predetermined time period (e.g., often in minutes or seconds), the primary nodes 202 terminate processing at 406, stores the fulfillment items in the data store 206, and clears memory 404. A fulfillment refers to the complete classification process from receipt of the digitized content in the assessment queue to the mapping or embedding of the classification or prediction in the metadata or extracted pages at the secondary nodes 204. Fulfillment also includes the information retained in a log file as a log entry that track all of the processing of the cluster. A cluster refers to the group of independent network servers and associated controllers that operate and appear to clients (here, the primary nodes 202)—as if they were a single unit. In FIG. 4 the five clusters 408-416 shown are designed to improve network capacity by, among other things, enabling the servers to process partitioned loads, which enhances network stability and minimizes data loss when systems fail.

In FIG. 4, the control engines of the primary nodes 202 continuously monitor the secondary nodes 204, looking for page classifications as they are generated. The control engines also track each of the classification processes, so that if a cluster executes a predetermined amount of processing time or resources, such as it processed about 75% of the pages it received for example in a predetermined amount of time, the sweep engine pushes the remaining 25% of the pages into a reassessment queue that processes the reaming pages as if they were originally received in the assessment queue. In FIG. 4, the sweep engine 418 runs at predetermined intervals, such as every ten minutes, for example, and also terminates at a fixed time period. Here, the control engine terminates the continuing assessments after about two hours.

Document assembly occurs through merger rules and sub-rules. One or more sub-rules allow users or devices to issue commands that merge pages through different and multiple criteria that is accessible to the fulfillment engines 420 and 422 through the export I/O API 340. In FIG. 4, merger strategies may be stored as individual profiles in the data store 206. The profiles allow users to customize merger strategies that may be based on any property or metadata associated with the classified pages, identified document types, and/or originating document and/or other criteria or criterion. The profiles may determine when mergers occur, where they occur, how they occur, the computer file formats they occur in and how the merged pages are compressed and/or how the merged pages are distributed (e.g., the medium).

With the processed documents assembled, the assembled pages are routed by an export API 340 that transmits the documents to a destination based on the classification. Routing information is retained in a log file as a log entry. In FIG. 4 the metadata generated by machine learning algorithm determines where the processed document is going and whether to trigger a script or initiate an alert.

Figure 5:
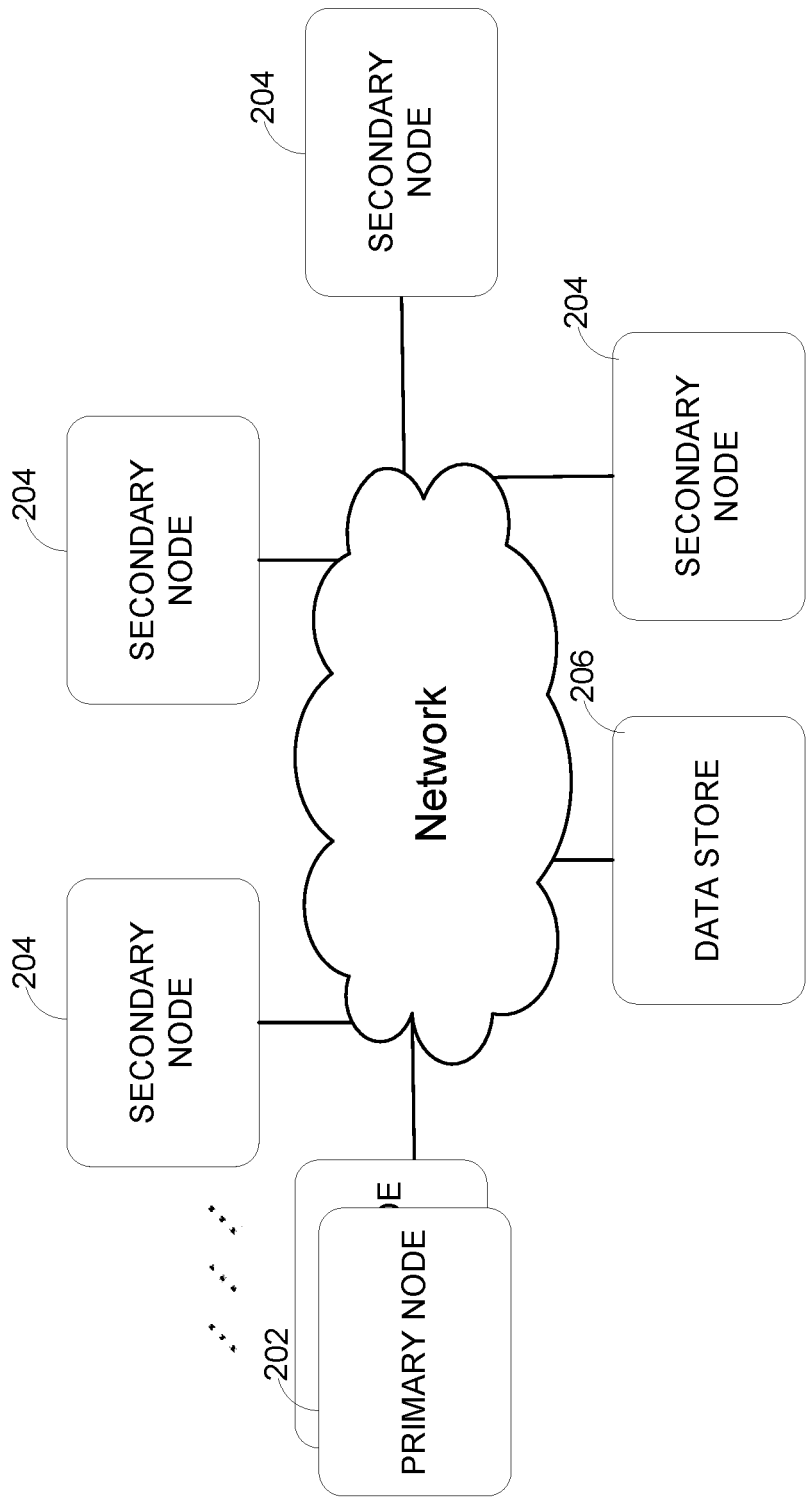
FIG. 5 is an alternate processing agent.

FIG. 5 is an alternate block diagram of the processing agent of FIG. 2. In FIG. 5, the communication bus of FIG. 2 is replaced by a network that allows the primary nodes 202, the secondary nodes 204, and the data store 206, to be hosted on remote distributed systems. The primary nodes 202, the secondary nodes 204, and the data store 206 and their alternates function as described above and herein.

Figure 6:
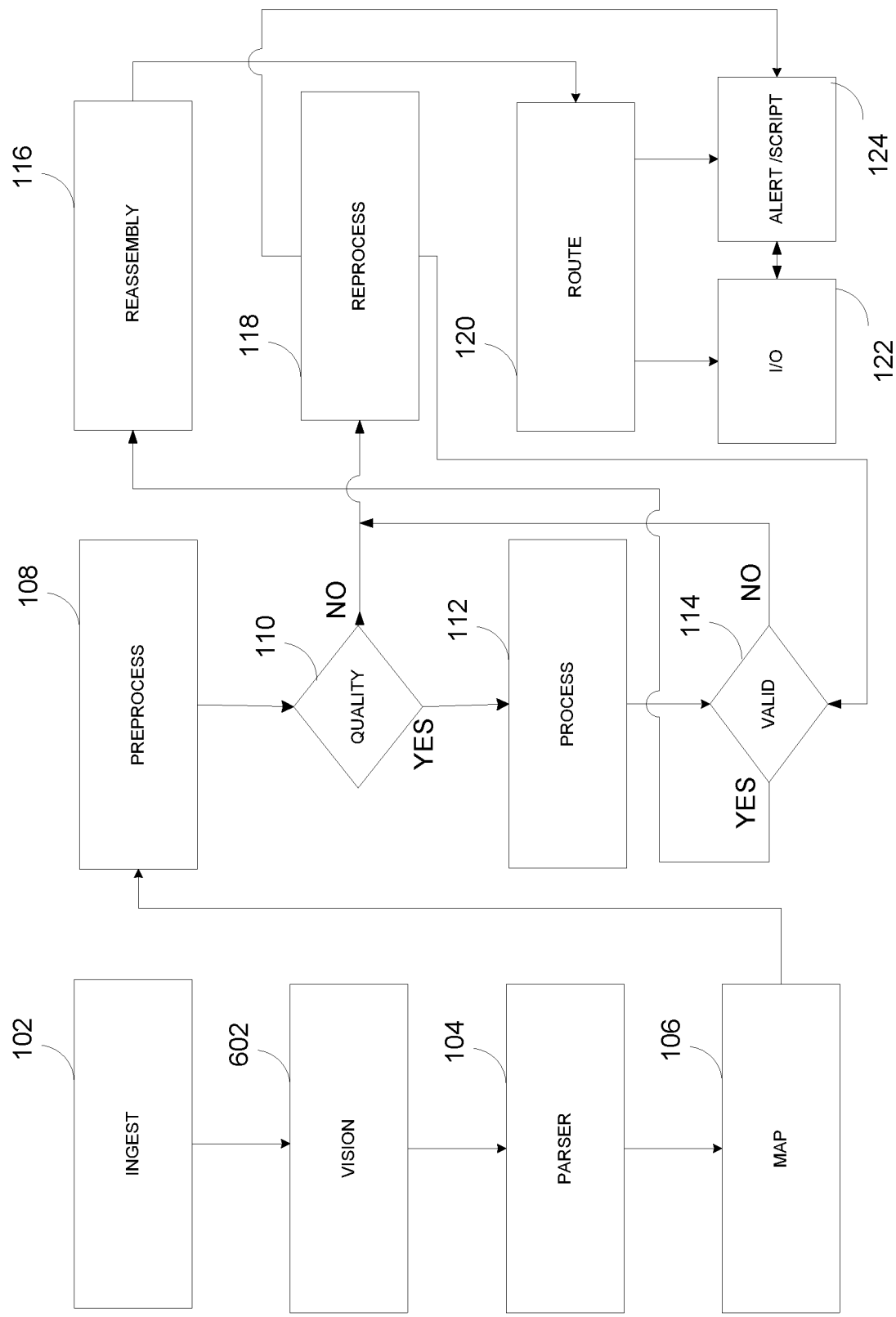
FIG. 6 is a process flow of a third processing agent.

FIG. 6 is an alternate block diagram of the processing agent process of FIG. 1. In FIG. 6, documents are received through the assessment queue and computer vision. Computer vision may stand alone, may be integrated with, or may be a unitary part of the primary nodes 202, the secondary nodes 204, the extractor 308 or any of the other modules, elements, or logic described herein. Physical objects may be identified through the computer vision engine 602 that may render an image document or a video sequence. The computer vision results may include physical object identification information, physical object position and orientation information, numerical measurement data, counts, and pre-designations classifications of physical objects, images of the physical object, and confidence values related to the physical object identification that are rendered as image documents. The remaining functions shown in FIG. 6 and their alternates function as described herein.

Figure 7:
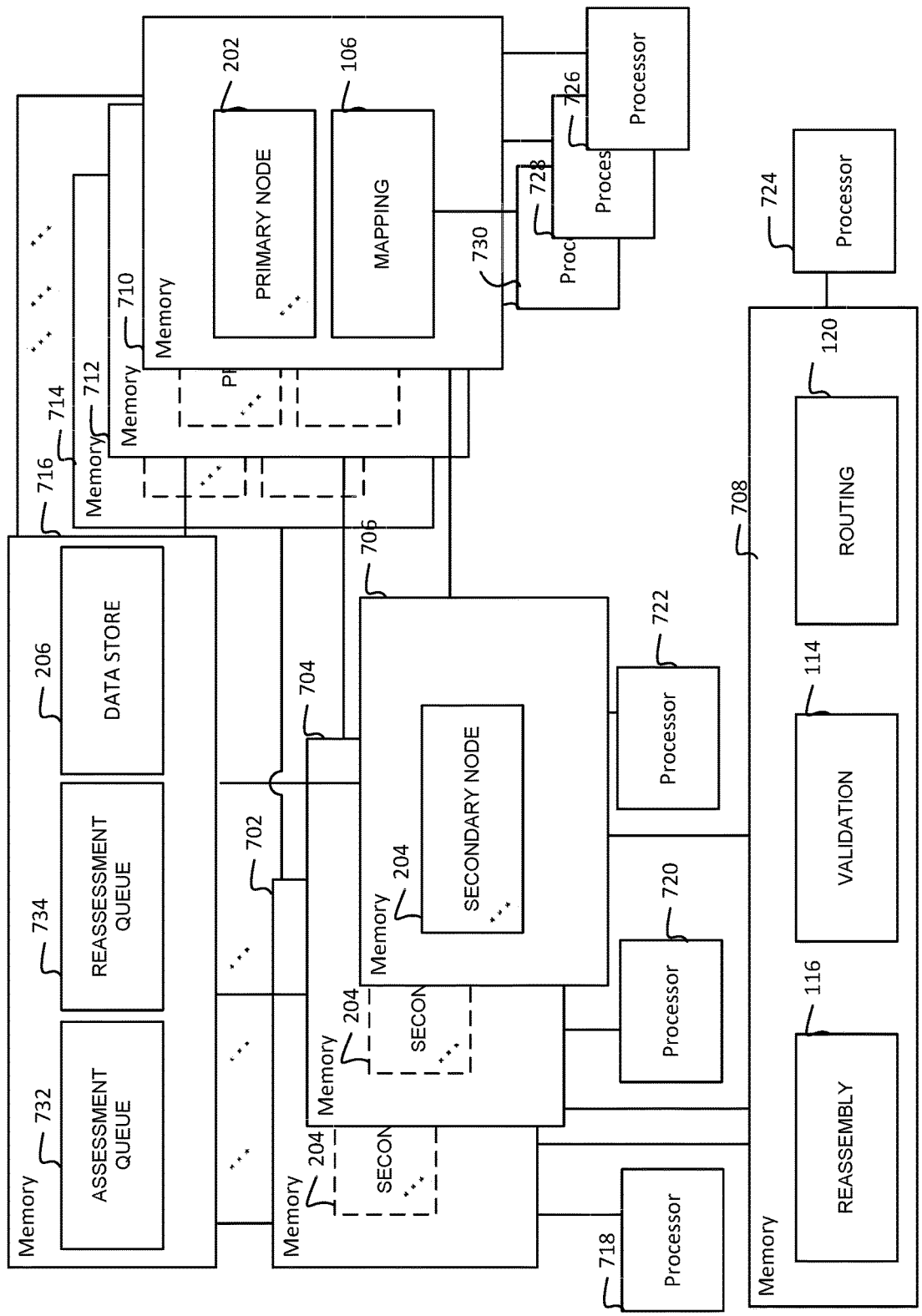
FIG. 7 is a block diagram third processing agent.

FIG. 7 is a block diagram of a second alternate block diagram of the alternate processing agent of FIG. 2. The system comprises multiple processors 718-730 (e.g., CPUs, GPUs, etc.), multiple non-transitory media 702-716 such as multiple memories (the contents of which are accessible to the processors 718-730, respectively). The memories 702-716 may store instructions which when executed by one or more of the processors 718-730, respectively, causes the systems and methods to render some or all of the functionality associated with the processing agents and some or all of the functionality of the evolutionary processes that generate the machine learning algorithms. For example, the memory 702-716 may store instructions which when executed by one or more of the processor 718-730, respectively, causes the system to render the functionality associated with one or more secondary nodes 204 (the symbol "··" shown in the secondary node blocks 204 establishes the other elements that comprise the secondary nodes 204 are hidden behind the block representation if not explicitly shown), the assessment queue 732, reassessment queue 734, the data store 206, the primary nodes 202, the reassembly logic 116, the validation logic 114, the routing logic 120, the encryption cipher 310, the learning algorithm 402, the primary nodes 202 (the symbol "··" shown in the primary node blocks 202 indicates the other elements that comprise the primary nodes 202 are hidden behind the block representation if not explicitly shown), the mapping logic 106, the auto index logic 320, the router tracker logic 350, the I/O APIs 122, 304 and 322, the export logic 340, the archive 360, the alert logic and scripts 124, the SQL databases 206, the seep logic 418, and/or the control engine. In addition, data structures, temporary variables, metadata and other information are stored in one or more memories 702-716.

The processors 718-730 may comprise a single processor with multiple cores or multiple processors with multiple cores, on multiple devices or distributed across more than one system that run in parallel. The processors 718-730 may be hardware that executes computer executable instructions or computer code embodied in the memory 702-716 or in other memory to perform one or more features of the disclosed system. The processors 718-730 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memories 702-716 or storage disclosed may retain an ordered listing of executable instructions for implementing the functions described herein. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random-Access Memory (RAM), a Read-Only Memory (ROM), an Erasable Programmable Read-Only Memory (EPROM or Flash memory), or a database management system. The memories 702-716 may comprise a single device or multiple devices that may be disposed on one or more dedicated memory devices or on a processor or other similar device.

The memories 702-716 may also store computer code that may include instructions executable by the processor 718-730. The computer code may be written in any computer language, such as C, C++, assembly language, channel program code, and/or any combination of computer languages. The memories 702-716 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device accessible to a remote machine. In other embodiments, the logic or instructions are stored in a remote location for transfer through a computer networks or over wireless or tangible communication lines. In yet other embodiments, the logic or instructions may be stored and executed by multiple GPU servers.

While each of the processing agents shown and described herein operate automatically and operate independently, they also may be encompassed within other systems and methods and execute any number "n" of iterations of some or all of the process used to enhance documents, recognize pages, render classification and/or route to destinations. Alternate processing agent may include any combinations of structure and functions described or shown in one or more of the FIGS. These automated processing systems are formed from any combination of structures and functions described herein. The structures and functions may process additional or different input. For example, alternate machine learning algorithms may perform classification based on a contextual analysis too. By including contexts in the training of the machine learning algorithm, the machine learning algorithm's automatic classifications are not limited to the processing of recognition vector to decision trees trained only on word and phrase combinations. This context-based training constitutes an improvement over traditional training as the machine learning algorithms are also based on user's intentions reflected in contexts expressed in the documents (via recognizing holistic context-sensitive exchanges by considering statements that surround a word or passage), rather than being based exclusively on isolated word and phrase input. The inclusion of sub-textual analysis in the machine algorithm's training enables a more flexible, nuanced, and accurate classification that can easily be tailored to the processing agent's applications.

Consider content that includes the term "comprehensive" in multiple pages. In these exemplary pages, the machine learning algorithm concludes that the user has demonstrated an unfamiliarity with insurance based on the user's failure to provide responses to common insurance questions rendered on the form. In viewing the context, the predetermined number of unanswered questions, the information provided on the document indicate that document is not from a customer of the insurance carrier (e.g., confirmed via a credential verification), and the use of the term "comprehensive" in the document, the machine learning algorithm associates and clarifies these contexts as pages requesting a bundled insurance quote.

If a machine learning algorithm were trained on the term "comprehensive" alone without context, and specifically with respect to automobiles, the term "comprehensive" would be understood to refers to one of three insurance coverages. The two other coverages are liability and collision. Collision covers damage to vehicles following a collision, and comprehensive fills in the gaps by covering damage to vehicles caused by anything other than a collision. While a recognition of the input alone would mistakenly classify the document as a request for insurance policy serving that should be routed to an insurance policy servicing destination; by including contexts and contextual associations in the machine learning algorithm training, the machine learning algorithm automatically classifies the pages as a document related to an insurance quote.

In yet another alternative processing agent, a detection system accurately detects anomalies in classified documents, and in response issues alerts or requests for supplemental information by transmitting request for clarifications via email or serving a URL. In some applications, when a predetermined number of unsolicited messages are asynchronously transmitted to many recipients, the machine learning algorithm also can classify the pages as spam and cause the computer system via an alert or script to block the documents due to the large number of similar messages received. The term spam refers to sending the same message indiscriminately to (large numbers of recipients).

The term "machine learning" refers to devices or machines that execute machine learning algorithms which use processing units' for character recognition. Some machine learning devices represent concepts in multiple hierarchical fashion with corresponds to various levels of abstraction. The term "coupled," disclosed in this description may encompass both direct and indirect coupling. Thus, a first and a second element are said to be coupled when they communicate directly with one another, as well as when the first element communicates through an intermediate component, which is connected directly or via one or more additional intermediate components to a second element. The term "substantially" or "about" may encompass a range that is largely, but not necessarily wholly, what is specified. It encompasses all but an insignificant amount, such as a variance within a range of five or ten percent of the given value. When devices are responsive to commands events, and/or requests, the actions and/or steps of the devices, such as the operations that devices are performing, necessarily occur as a direct or an indirect result of the preceding commands, events, actions, and/or requests. In other words, the operations occur as a result of the preceding operations. A device that is responsive to another requires more than an action (i.e., the device's response to) merely follow another action.

A processing agent translate and expedite content delivery of physical and virtual documents. The physical and virtual documents include documents or pages that contain unstructured data that either does not have a predefined data model or is not organized in a pre-defined manner. An end-to-end learning system learns contexts and uses its contextual knowledge to efficiently route documents to destinations. A detection system accurately detects anomalies, and in some applications, protects backend systems from unsolicited messages asynchronously transmitted to many recipients. An automated job separation system parses documents by breaking documents into pages so that only desired pages are routed to apt destinations. The job separation system enables multiple documents to be processed simultaneously without job separation sheets.

Some processing agents include an export API that transmits documents in any desired format to a folder, an address, or a destination. Some systems transmit commands that enable scripts. Scripts may request information from remote sources, generate and transmit forms to users, notify users of outcomes, and issue audible or visual alerts to sources or users that signal an error, missing information, or represent a warning. Some document processing agents execute data compressions that reduces memory and bandwidth use. The document processing agents execute across multiple nodes allowing the processing agents to distribute jobs across local and/or remote computing resources.

The subject-matter of the disclosure may also relate, among others, to the following aspects (referenced by numbers):

1. A method of classifying insurance documents having insurance data, the method comprising:

receiving a request to access a plurality of documents in an assessment queue stored in a memory of a device; each of the plurality of documents are made up of pages containing insurance data and have an associated pre-defined destination and an associated metadata;

converting a set of documents encoded in a first file format for storage in a non-transitory computer media into a second file format that removes the metadata associated with each document of the set of documents;

partitioning each document of the set of documents into separate stand-alone documents such that each partitioned document represents no more than a physical page;

converting each of the partitioned documents into separate recognition vectors that represent information conveyed in each of the partitioned documents;

classifying the partitioned documents through an additive learning algorithm in which routing data is embedded in second metadata associated with each of the partitioned documents;

merging the classified partitioned documents in response to a plurality of rules based at least in part on the second metadata; and causing the merged documents to be routed to a remote destination independent of the predefined destination and the metadata.

2. The method of aspect 1 where the plurality of documents comprises email and digital content.

3. The method of any of aspects of 1 to 2 where the first file format is different from the second file format.

4. The method of any of aspects of 1 to 3 further comprising distributing the partitioned documents across a plurality of servers.

5. The method of any aspects of 1 to 4 further comprising executing an optical contrast to detect the letters and characters contained in the set of documents.

6. The method of any of aspects of 1 to 5 further comprising applying a weighting to scalar variables that comprise the recognition vectors based on an active grammar or a pre-defined document type.

7. The method of any aspects of 1 to 6 where the additive learning algorithm comprises a decision tree.

8. The method of aspect 7 where the decision tree is a boosted decision tree.

9. The method of aspect 7 where the time required to train the additive learning algorithm is proportional to a number of splits executed on the decision tree.

10. The method of aspect 7 where the decision tree is trained on contextual associations between words and phrases.

11. The method of any aspects of 1 to 10 further comprising causing the partitioned documents to undergo a data compression that reduces the amount of memory required to store the partitioned documents.

12. The method of any aspects of 1 to 11 where the merging of the partitioned documents is based on at least on one Boolean function.

13. The method of any aspects of 1 to 12 where the plurality of rules is stored in individual profiles in a memory which determine when the merging occurs, where the merging occurs, or how the merging occurs.

14. The method of any aspects of 1 to 13 where the plurality of rules is stored in individual profiles in a memory which determine computer file formats that the merging occurs or how the merged partitioned documents are compressed or mediums that distribute the merged documents.

15. The method of any aspects of 1 to 14 further comprising causing the issuance of a warning in response to the classification of the partitioned documents.

16. The method of any aspects of 1 to 15 further comprising initiating a script in response to the classification of the partitioned documents.

17. A non-transitory machine-readable medium encoded with machine-executable instructions for classifying insurance documents having insurance data, where execution of the machine-executable instructions is for:

receiving a request to access a plurality of documents in an assessment queue stored in a memory of a device; each of the plurality of documents are made up of pages containing insurance data and have an associated pre-defined destination and an associated metadata;

converting a set of documents encoded in a first file format for storage in a non-transitory computer media into a second file format that removes the metadata associated with each document of the set of documents;

partitioning each document of the set of documents into separate stand-alone documents such that each partitioned document represents no more than a physical page;

converting each of the partitioned documents into separate recognition vectors that represent information conveyed in each of the partitioned documents;

classifying the partitioned documents through an additive learning algorithm in which routing data is embedded in second metadata associated with each of the partitioned documents;

merging the classified partitioned documents in response to a plurality of rules based at least in part on the second metadata; and causing the merged documents to be routed to a remote destination independent of the predefined destination and the metadata.

18. The non-transitory machine-readable medium of any aspect 17 where the plurality of documents comprises email and digital content.

19. The non-transitory machine-readable medium of any aspects of 17 to 18 where the first file format is different from the second file format.

20. The non-transitory machine-readable medium of any aspects of 17 to 19 further comprising distributing the partitioned documents across a plurality of servers.

21. The non-transitory machine-readable medium of any aspects of 17 to 20 further comprising executing an optical contrast to detect letters and characters contained in the set of documents.

22. The non-transitory machine-readable medium of any aspects of 17 to 22 further comprising applying a weighting to scalar variables that comprise the recognition vectors based on an active grammar or a predefined document type.

23. The non-transitory machine-readable medium of any aspects of 17 to 22 where the additive learning algorithm comprises a decision tree.

24. The non-transitory machine-readable medium of any aspect of 23 where the decision tree is a boosted decision tree.

25. The non-transitory machine-readable medium of any aspect of 23 where the time required to train the additive learning algorithm is proportional to a number of splits executed on the decision tree.

26. The non-transitory machine-readable medium of any aspect of 23 where the decision tree is trained on contextual associations between words and/or phrases.

27. The non-transitory machine-readable medium of any aspects of 17 to 26 further comprising causing the partitioned documents to undergo a data compression that reduces the amount of memory required to store the partitioned documents.

28. The non-transitory machine-readable medium of any aspects of 17 to 27 where the merging of the partitioned documents is based on at least one Boolean function.

29. The non-transitory machine-readable medium of any aspects of 17 to 28 where the plurality of rules is stored in individual profiles in a memory which determine when the merging occurs, where the merging occurs, or how the merging occurs.

30. The non-transitory machine-readable medium of any aspects of 17 to 29 where the plurality of rules is stored in individual profiles in a memory which determine computer file formats that the merging occurs, how the merged partitioned documents are compressed or mediums that the merged documents are distributed.

31. The non-transitory machine-readable medium of any aspects of 17 to 31 further comprising causing the issuance of a warning in response to the classification of the partitioned documents or initiating a script in response to the classification of the partitioned documents.

32. A system that classifies insurance documents having insurance data, the system comprising:

an assessment queue storing a plurality of documents in a memory of a device; each of the plurality of documents comprise pages containing insurance data, each document having an associated pre-defined destination and associated metadata;

a plurality of primary nodes representing a plurality of independent processing units that automatically:
  convert a set of documents encoded in a first file format for storage in a non-transitory computer media to a second file format that removes the metadata associated with each document; and
  partition each document of the set of documents into separate stand-alone documents such that each partitioned document represents no more than a physical page;

a plurality of secondary nodes representing a plurality of independent processing units that automatically:

convert each of the partitioned documents into separate recognition vectors that represent the information contained in the partitioned documents;

classify the partitioned documents through an additive learning algorithm in which routing data is embedded in second metadata associated with each of the partitioned documents;

merge the classified partitioned documents based on a plurality of rules based at least in part on the second metadata; and cause the merged documents to be routed to a remote destination independent of the predefined destination.

33. The system of any aspects of 32 where the plurality of documents comprises email and digital content.

34. The system of any aspects of 32 to 33 where the first file format is different from the second file format.

35. The system of any aspects of 32 to 35 further comprising distributing the partitioned documents across a plurality of servers.

36. The system of any aspects of 32 to 35 further comprising executing an optical contrast to detect letters and characters contained in the set of documents.

37. The system of any aspects of 32 to 35 further comprising applying a weighting to scalar variables that comprise the recognition vectors based on an active grammar or a predefined document type.

38. The system of any aspects of 32 to 35 where the additive learning algorithm comprises a decision tree.

39. The system of any aspect of 38 where the decision tree is a boosted decision tree.

40. The system of any aspect of 38 where the time required to train the additive learning algorithm is proportional to a number of splits executed on the decision tree.

41. The system of any aspect of 38 where the decision tree is trained on contextual association between words and/or phrases.

42. The system of any aspects of 32 to 41 further comprising causing the partitioned documents to undergo a data compression.

43. The system of any aspects of 32 to 42 where the merging of the partitioned documents is based on at least one Boolean function.

44. The system of any aspects of 32 to 43 where the plurality of rules is stored in individual profiles in a memory which determine when the merging occurs, where the merging occurs, or how the merging occurs.

45. The system of any aspects of 32 to 44 where the plurality of rules is stored in individual profiles in a memory which determine computer file formats that the merging occurs or how the merged partitioned documents are compressed or mediums that the merged documents are distributed.

46. The system of any aspects of 32 to 45 further comprising causing the issuance of a warning in response to the classification of the partitioned documents.

47. The system of any aspects of 32 to 46 further comprising initiating a script in response to the classification of the partitioned documents.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method of classifying insurance documents having insurance data, the method comprising:

receiving a request to access a plurality of documents in an assessment queue stored in a memory of a device; each of the plurality of documents is made up of pages containing insurance data and have an associated predefined destination and an associated metadata before the plurality of documents are read;

converting a set of documents encoded in a first file format for storage in a non-transitory computer media into a second file format that removes all of the metadata associated with each document of the set of documents;

partitioning each document of the set of documents into separate stand-alone documents such that each partitioned document represents no more than a physical page;

converting each of the partitioned documents into separate recognition vectors that represent information conveyed in each of the partitioned documents;

classifying the partitioned documents through machine learning algorithms comprising a plurality of learning models that are combined to generate a summed output;

the plurality of learning models includes a successive learning model that minimizes a plurality of residuals generated from a preceding learning model;

processing the summed output as an input to a subsequent learning model separate from the plurality of learning models that embeds routing data in second metadata within and associated with each of the partitioned documents that reduces a prediction error;

merging the classified partitioned documents in response to a plurality of rules based at least in part on the second metadata; and causing the merged documents to be routed to a remote destination independent of the predefined destination and the associated metadata.

2. The method of claim 1 where the plurality of documents comprises email and digital content.

3. The method of claim 1 where the first file format is different from the second file format.

4. The method of claim 1 further comprising distributing the partitioned documents across a plurality of servers.

5. The method of claim 1 further comprising executing an optical contrast to detect letters and characters contained in the set of documents.

6. The method of claim 1 further comprising applying a weighting to scalar variables that comprise the recognition vectors based on an active grammar or a predefined document type.

7. The method of claim 1 where the machine learning algorithms include a decision tree.

8. The method of claim 7 where the decision tree comprises a boosted decision tree.

9. The method of claim 7 where a time required to train the machine learning algorithms is proportional to a number of splits executed on the decision tree.

10. The method of claim 7 where the decision tree is trained on a plurality of words or phrases and a contextual association between the plurality of words or phrases that comprise one or more statements that surround the plurality of words or phrases that represent a user's intentions.

11. The method of claim 1 where the merging of the partitioned documents is based on at least one Boolean function.

12. The method of claim 1 where the plurality of rules is stored in individual profiles in a memory which, determine when the merging occurs, where the merging occurs, or how the merging occurs.

13. The method of claim 1 where the plurality of rules is stored in individual profiles in a memory which determine computer file formats that the merging occur or how the merged documents are compressed or mediums that distribute the merged documents.

14. The method of claim 1 further comprising causing issuance of a warning in response to the classification of the partitioned documents.

15. The method of claim 1 further comprising initiating a script in response to the classification of the partitioned documents.

16. A non-transitory machine-readable medium encoded with machine-executable instructions for classifying insurance documents having insurance data, where execution of the machine-executable instructions is for:
receiving a request to access a plurality of documents in an assessment queue stored in a memory of a device; each of the plurality of documents are made up of pages containing insurance data and have an associated destination and an associated metadata before the plurality of documents are read;
converting a set of documents encoded in a first file format for storage in a non-transitory computer media into a second file format that removes all of the metadata associated with each document of the set of documents;
partitioning each document of the set of documents into separate stand-alone documents such that each partitioned document represents no more than a physical page;
converting each of the partitioned documents into separate recognition vectors that represent information contained in each of the partitioned documents;
classifying the partitioned documents through machine learning algorithms comprising a plurality of learning models that are combined to generate a summed output;
the plurality of learning models includes a successive learning model that minimizes a plurality of residuals generated from a preceding learning model;
processing the summed output as an input to a subsequent learning model separate from the plurality of learning models in which routing data is embedded in second metadata associated with each of the partitioned documents that reduces a prediction error;
merging the classified partitioned documents in response to a plurality of rules based at least in part on the second metadata; and
causing the merged documents to be routed to a remote destination independent of the predefined destination and the associated metadata.

17. The non-transitory machine-readable medium of claim 16 where the plurality of documents comprises email and digital content.

18. The non-transitory machine-readable medium of claim 16 where the first file format is different from the second file format.

19. The non-transitory machine-readable medium of claim 16 further comprising distributing the partitioned documents across a plurality of servers.

20. The non-transitory machine-readable medium of claim 16 further comprising applying a weighting to scalar variables that comprise the recognition vectors based on an active grammar or a predefined document type.

21. The non-transitory machine-readable medium of claim 16 where the machine learning algorithms include a decision tree.

22. The non-transitory machine-readable medium of claim 21 where the decision tree is a boosted decision tree.

23. The non-transitory machine-readable medium of claim 21 where a time required to train the machine learning algorithms is proportional to a number of splits executed on the decision tree.

24. The non-transitory machine-readable medium of claim 21 where the decision tree is trained on a plurality of words or phrases and a plurality of contextual associations between the plurality of words or phrases that comprise one or more statements that surround the plurality of words or phrases that represent a user's intentions.

25. The non-transitory machine-readable medium of claim 16 further comprising causing the partitioned documents to undergo a data compression.

26. The non-transitory machine-readable medium of claim 16 where the merging of the partitioned documents is based on at least one Boolean operator.

27. The non-transitory machine-readable medium of claim 16 where the plurality of rules is stored in individual profiles in a memory, which determine when the merging occurs, or where the merging occurs or how the merging occurs.

28. The non-transitory machine-readable medium of claim 16 where the plurality of rules is stored in individual profiles in a memory which determine computer file formats that the merging occurs or how the merged partitioned documents are compressed or mediums that distribute the merged documents.

29. A non-transitory machine-readable medium encoded with machine-executable instructions for classifying documents, where execution of the machine-executable instructions is for:
receiving a request to access a plurality of documents in an assessment queue stored in a memory of a device; each of the plurality of documents are made up of pages containing content data and have an associated predefined destination and an associated metadata before the plurality of documents are read;
removing all of the metadata associated with each document of a set of documents;
partitioning each document of the set of documents into separate stand-alone documents such that each partitioned document represents no more than a physical page;
converting each of the partitioned documents into separate recognition vectors that represent information contained in each of the partitioned documents;
classifying the partitioned documents through a machine learning algorithm comprising a plurality of learning models that are combined to generate a summed output;
the plurality of learning models includes a successive learning model that minimizes a plurality of residuals generated from a preceding learning model;
processing the summed output as an input to a subsequent learning model separate from the plurality of learning models that embeds routing data in second metadata within and associated with each of the partitioned documents that reduces a prediction error;
merging the classified partitioned documents in response to a plurality of rules based at least in part on the second metadata; and causing the merged documents to be routed to a remote destination independent of the associated predefined destination and the associated metadata.

30. The non-transitory machine-readable medium of claim 29 where the physical page comprises a file of a predetermined length.

\* \* \* \* \*